United States Patent [19]

Abolins et al.

[11] Patent Number: 4,497,925
[45] Date of Patent: Feb. 5, 1985

[54] FLAME RESISTANT THERMOPLASTIC BLENDS OF POLYPHENYLENE OXIDE, POLYOLEFIN AND HYDRATED ALUMINA

[75] Inventors: Visvaldis Abolins, Delmar, N.Y.; Joseph E. Betts, Westport, Conn.; Fred F. Holub, Schenectady, N.Y.

[73] Assignee: General Electric Company, Pittsfield, Mass.

[21] Appl. No.: 293,242

[22] Filed: Aug. 17, 1981

Related U.S. Application Data

[63] Continuation of Ser. No. 111,961, Jan. 14, 1980, abandoned.

[51] Int. Cl.$^3$ .................... C08L 23/02; C08L 83/04
[52] U.S. Cl. ................... 524/269; 524/328; 524/437; 525/92; 525/101; 525/106; 525/132
[58] Field of Search ............ 524/437, 269, 328; 525/92, 101, 132, 106

[56] References Cited

U.S. PATENT DOCUMENTS

| | | | |
|---|---|---|---|
| 3,306,875 | 2/1967 | Hay | 528/215 |
| 3,663,654 | 5/1972 | Haaf | 525/132 |
| 3,956,212 | 5/1976 | Sakaguchi et al. | 428/461 |
| 3,979,356 | 9/1976 | Walters | 428/379 |
| 4,034,136 | 7/1977 | Wright et al. | 428/246 |
| 4,081,424 | 3/1978 | Gergen et al. | 525/92 |
| 4,166,055 | 8/1979 | Lee | 525/92 |

FOREIGN PATENT DOCUMENTS

| | | | |
|---|---|---|---|
| 2439490 | 3/1975 | Fed. Rep. of Germany | 525/101 |
| 50-1141 | 1/1975 | Japan | 525/132 |

*Primary Examiner*—Wilbert J. Briggs, Sr.
*Attorney, Agent, or Firm*—Hedman, Gibson, Costigan & Hoare

[57] ABSTRACT

Improved flame resistance is imparted to polymeric resins by incorporation of a blend of hydrated alumina and polyphenylene oxide, or a blend of hydrated alumina, polydiorganosiloxane and polyphenylene oxide.

16 Claims, No Drawings

FLAME RESISTANT THERMOPLASTIC BLENDS OF POLYPHENYLENE OXIDE, POLYOLEFIN AND HYDRATED ALUMINA

This is a continuation of application Ser. No. 111,961 filed Jan. 14, 1980, now abandoned.

BACKGROUND OF THE INVENTION

A common drawback of polymeric resins is their flammability. This property hinders their usage. As a result, it has been common to incorporate amounts of flame retardants into resins. Representative such retardants most commonly include phosphorous-, antimony- and halogen-containing compounds.

Unfortunately several factors may reduce the desirability of such well known fire retardants. With some resins, they may induce degradation of the polymer or its properties and/or evidence less than expected effectiveness. These and other known factors may render the polymeric resins unsuitable for many specific applications.

According to the present invention, there is provided a means of avoiding the foregoing drawbacks and undesirable factors of conventional resins and fire retardants. This means involves incorporating a blend of hydrated alumina and polyphenylene oxide, alone, or with polydiorganosiloxane into the normally flammable polymeric resin. This blend produces a plastic composition having improved fire resistance, while avoiding the adverse affects incident to conventional fire retardant additives.

DESCRIPTION OF THE INVENTION

The polymeric resins susceptible to being improved in accordance with the present invention are those which are "normally flammable". This term is generally accepted to mean, and is defined herein as including, resins failing to meet the standards of ASTM test method D-635 and Underwriter's Laboratories Bulletin No. 94.

For convenience, a polymeric resin may also be tested by subjecting a molding ($2\frac{1}{2}''\times\frac{1}{2}''\times\frac{1}{8}''$) to two successive 10-second ignitions from a bunsen burner. If it will not extinguish itself within 30 seconds after ignition, it is deemed "normally flammable".

There are many polymeric resins which are normally flammable. These include polycarbonates, polyesters, polyacetals polyformals and the like. Some of the most problematic resins are the polyolefins, particularly polyethylene and polypropylene. These normally flammable polymeric resins also include compound resin systems containing one or more individual such resins.

The concern for the flammable nature of these polymeric resins is especially acute where they are intended for particular applications. By way of example, resin utilized for coating of electrical wires or in electrical components must exhibit high flame resistance. Similarly molded resin compositions—often forming parts of furniture, automatic parts and the like—must be flame resistant to provide safety.

The thermoplastic (non-thermosetting) blend utilized in accordance with the present inventions should be present in an amount effective to provide the desired degree of flame resistance. This amount will obviously vary, dependant upon the specific polymeric resin being stabilized and the intended application of the ultimate plastic composition. To ensure optimum results, however, the blend and resin are generally present in a weight ratio of between about 1:1 and 3:1, more preferably 1.3:1 and 2:1, respectively.

The blend is composed of hydrated alumina and polyphenylene oxide, alone, or in further combination with polydiorganosiloxane (a mixture being not normally flammable so as to require stabilization). The two components are generally present in a weight ratio of between about 30:1 and 5:1, more preferably 12:1 and 8:1. The three components are generally present in a weight ratio of between about 30:1:0.1 and 5:1:1 and more preferably 12:1:0.1 and 8:1:0.5. This appears to result in optimization of their interaction and/or cooperation in imparting fire retardance to the polymeric resin.

In compounding the blend (or the plastic composition, if all components are combined at the same time), the type or types of hydrated alumina employed are relatively unimportant. The most common such hydrates—e.g. mono and tri—as well as the various crystalline forms—e.g. beta and gamma—(and admixtures thereof) are all suitable and may be utilized.

The hydrated alumina is desirably finely dispersed throughout the blend and plastic composition. This provides maximum interaction with the polyphenylene oxide and optimizes fire retardance. Accordingly, it is preferred to employ alumina having a median particle size of less than $60\mu$, preferably between about 1 and $40\mu$, in diameter, and to disperse the particles homogeneously throughout the plastic composition.

The alumina employed may also vary greatly in total weight basis. Ordinarily, however, it is present in from about 50% to 70%, more preferably from about 50% to 65%, by weight of the composite plastic composition.

The form of the polyphenylene oxide of the blend is likewise unimportant. Useful in accordance with this invention are any polymers having the repeating structural unit:

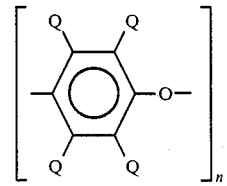

wherein the oxygen (or ether) atom of one unit in connected (except at the chain terminus) to the nucleus of the next adjoining unit; n is a positive integer of at least 50; at least, and preferably only one, Q (except at the chain inception) indicates the point of oxygen (ether) attachment from an adjoining unit and the remaining Q's are each independently selected from monovalent substituents comprising hydrogen, halogen, hydrocarbon radicals, halohydrocarbon radicals and hydrocarbonoxy radicals. Preferred examples of such polyphenylene oxides are described in U.S. Pat. No. 3,306,875 to Hay the disclosure of which is incorporated herein by reference.

Polyphenylene oxide may also be provided by incorporating suitable mixtures containing that polymer into the ultimate plastic composition. Where such mixtures are employed, the nonpolyphenylene oxide component(s) thereof are treated (if normally flammable) as a part of the polymeric resin or (if not normally flammable) as a diluent and may be ignored in the formulation of the foregoing proportions.

There is again no criticality in the amount of this blend component. The polyphenylene oxide usually ranges, however, from between 0.5% and 18%, more desirably between 2% and 9%, by total weight.

In addition to the essential resin and blend components of the present plastic compositions, others may be present as desired. In particular, conventional fire retardants may be present. These further improve the properties of the composition. Because of the presence of the hydrated alumina/polyphenylene oxide blend, however, highly desirable properties may be achieved with only fractions of conventional amounts of these additives. This minimizes or eliminates the aforementioned adverse factors often associated with their use.

The term "polydiorganosiloxane" includes compounds consisting essentially of chemically combined units of the formula $$-\underset{R}{\overset{R}{\text{Si}}}\text{O}-,$$

where R is a monovalent organic radical selected from the class consisting of $C_{(1-8)}$ alkyl radicals, $C_{(6-13)}$ aryl radicals, halogenated derivatives of such radicals, cyanoalkyl radicals, etc. The aforementioned polydiorganosiloxanes are preferably polydimethylsiloxanes which can contain from about 0.05 to 15 mole percent based upon the total moles of chemically combined diorganosiloxy units of methylvinylsiloxy units. The aforementioned polydiorganosiloxanes are preferably in the form of gums having a penetration value of 400 to 4000, etc. Many are commercially available, and all can be made by techniques known to those skilled in this art. The polydiorganosiloxane usually ranges from about 0.1 to 6%, more desirably between 0.5 to 4%, by total weight.

Also commonly present are additives. These may include such diverse components as glass reinforcements, pigments and even further, but not normally, flammable polymer. These components may be present in the initial polymeric resin or the blend or even separately admixed therewith to produce a compound plastic composition. They are compounded in accordance with conventional manner to provide the properties for which each is already known.

The following examples are given by way of illustration only and are not intended as limitations on the scope of this invention. Many variations are possible without departing from its spirit and scope. Unless otherwise specified herein, all proportions are provided on a weight basis.

EXAMPLE 1

Molded products were prepared from two plastic compositions and tested for flame resistance. The results were as follows:

| Components | Example (Parts by Weight) A* | 1 |
|---|---|---|
| Polypropylene | 90 | 80 |
| Styrene-Butadiene-Styrene (Block Copolymer) | 10 | 10 |
| Polyphenylene Oxide | — | 10 |
| Hydrated Alumina (20μ) | 175 | 175 |
| Dimethylpolysiloxane | 3 | 3 |
| Heat Distortion 264 psi ° F | 230 | 207 |
| Flammability Test ** | | |
| 1st Ignition | + | 0,0 |
| 2nd Ignition | | 0,0 |

* Control
** Quench time in seconds

This data points out the substantial improvement in flame retardance engendered by use of the present compositions (Example 1) as compared to only one of the essential blend components ("Control sample A"). The cooperation between the blend ingredients resulted in a greatly reduced hazard. Moreover, in addition to reducing flammability, the blend also provided substantial stabilization against heat distortion, compared to phosphates.

EXAMPLES 2-15

A series of molded products were prepared from plastic compositions and tested for flame resistance. The results are in Table 1:

TABLE 1

| | Flammability Tests | | | | | | | |
|---|---|---|---|---|---|---|---|---|
| | Examples (Parts by Weight) | | | | | | | |
| Components | 2 | 3 | 4 | 5 | 6 | 7 | 8 | 9 |
| Polypropylene | 70 | 60 | 50 | 70 | 70 | 70 | 70 | 70 |
| Styrene-Butadiene-styrene (block copolymer) | 10 | 10 | 10 | 10 | 10 | 10 | 10 | 10 |
| 70% Polystyrene 30% Polyphenylene oxide | 20 | 30 | 40 | — | 20 | 20 | 20 | 20 |
| Polyphenylene Oxide | — | — | — | 20 | — | — | — | — |
| Hydrated Alumina 20μ | 150 | 150 | 150 | 150 | 100 | 125 | 150 | 175 |
| Antioxidant, Santowhite crystals | 0.25 | 0.25 | 0.25 | 0.25 | 0.25 | 0.25 | 0.25 | 0.25 |
| Dibasic Lead Phthalate | 3 | 3 | 3 | 3 | 3 | 3 | 3 | 3 |
| Dimethyl Polysiloxane | 4 | 4 | 4 | 4 | 4 | 4 | 4 | 4 |
| Titanium Dioxide | 3 | 3 | 3 | 3 | 3 | 3 | 3 | 3 |
| Dimethyl Siloxane Fluid, 100 cs | 3 | 3 | 3 | 3 | 3 | 3 | 3 | 3 |
| Flammability Test (quench time, seconds) | | | | | | | | |
| 1st Ignition | 0,0 | 0,0 | 0,0 | 0,0 | >30 | >30 | 0,0 | 0,0 | 0,0 |
| 2nd Ignition | 0,0 | 0,0 | 0,0 | 0,0 | —,— | 0,0 | 0,0 | 0,0 |
| | Examples (Parts by Weight) | | | | |
| Components | 10 | 11 | 12 | 13 | 14 | 15 |

TABLE 1-continued

| Flammability Tests | | | | | | |
|---|---|---|---|---|---|---|
| Polypropylene | 70 | 70 | 70 | 70 | — | — |
| High Density Polyethylene | — | — | — | — | 70 | — |
| Ethylene Propylene Copolymer | — | — | — | — | — | 70 |
| Styrene-Butadiene-Styrene Block Copolymer | 10 | 10 | 10 | 10 | 10 | 10 |
| 70% Polystyrene/ 30% Polyphenylene oxide | 20 | 20 | 20 | 20 | 20 | 20 |
| Hydrated Alumina, 20μ | 150 | 150 | 150 | 200 | 200 | 200 |
| Antioxidant Santowhite crystals | 0.25 | 0.25 | 0.25 | 0.25 | 0.25 | 0.25 |
| Di-Basic Lead Phthalate | 3 | 3 | 3 | 3 | 3 | 3 |
| Dimethyl Polysiloxane | 0 | 8 | 12 | 4 | 4 | 4 |
| Titanium Dioxide | 3 | 3 | 3 | 3 | 3 | 3 |
| Dimethyl Siloxane Fluid, 100 cs | 3 | 3 | 3 | 3 | 3 | 3 |
| Flammability Test (quench time, seconds) | | | | | | |
| 1st Ignition | 0,0 | 0,0 | 0,0 | 0,0 | 0,0 | 0,0 |
| 2nd Ignition | >30,>30 | 0,0 | 0,0 | 0,0 | 0,0 | 0,0 |

This data shows that the blend is most effective when the hydrated alumina is within the range of from 50% to 65% and the polyphenylene oxide is within the range of from 2% to 9%, by total weight. These proportions provide functionally complete fire resistance for most situations with minimal amounts of additives.

Obvious variations will suggest themselves to those skilled in this art in light of the above-detailed disclosure. All such variations are within the full intended scope of the appended claims.

We claim:

1. A thermoplastic (non-thermosetting) composition comprising (a) a normally flammable polyolefin resin and (b) a blend of (i) hydrated alumina, (ii) polydiorganosiloxane and (iii) polyphenylene oxide, said blend being present in an amount effective to improve the flame resistance of the polyolefin resin.

2. The composition of claim 1 wherein the alumina and polyphenylene oxide are present in a ratio of between 30:1 and 5:1 by weight.

3. The composition of claim 2, wherein the blend and resin are present in a ratio of between about 1:1 and 3:1 by weight.

4. The composition of claim 1 wherein the polyolefin is polypropylene.

5. The composition of claim 1 wherein the polyolefin is polyethylene.

6. The composition of claim 1 wherein the polyolefin is ethylene-propylene copolymer.

7. The composition of claim 1 wherein the alumina comprises from about 50 to 70%, the polydiorganosiloxane comprises from about 0.1 to 6%, and the polyphenylene oxide comprises from about 0.5 to 18% by total weight of the thermoplastic composition.

8. The composition of claim 1 wherein the alumina comprises from about 50 to 65%, the polydiorganosiloxane comprises from about 0.5 to 4%, and the polyphenylene oxide comprises from about 2 to 9% by total weight of the thermoplastic composition.

9. The composition of claim 1, which includes a lead salt.

10. The composition of claim 1, which includes a lead phthalate.

11. The composition of claim 1, in which the polydiorganosiloxane is polydimethylsiloxane.

12. The composition of claim 11, in which the polydimethylsiloxane is a fluid.

13. The composition of claim 1, in which the hydrated alumina has a median particle size of less than 60 microns in diameter.

14. The composition of claim 13, in which the median particle size of the alumina is between about 1 and 40 microns in diameter.

15. The composition of claim 1, which includes a styrene-butadiene-styrene block copolymer.

16. A thermoplastic composition comprising a normally flammable polyolefin resin selected from the group consisting of polyethylene, polypropylene and ethylene-propylene copolymers, and a flame resistance improving amount of a blend of hydrated alumina, polydimethylsiloxane and polyphenylene oxide, said composition also including dibasic lead phthalate.

* * * * *

UNITED STATES PATENT AND TRADEMARK OFFICE
CERTIFICATE OF CORRECTION

PATENT NO. : 4,497,925
DATED : February 5, 1985
INVENTOR(S) : Visvaldis Abolins, et al.

It is certified that error appears in the above—identified patent and that said Letters Patent is hereby corrected as shown below:

In column 4, beginning on line 15, in the column of numbers under the heading letter "A", in the row corresponding to "1st Ignition", instead of a plus sign (+), there should be the term -- >30--; and in the adjacent column of numbers under the heading number "1", in the row corresponding to "Hydrated Alumina ($20\mu$)", there should be the number --175--.

Signed and Sealed this

Thirteenth Day of August 1985

[SEAL]

Attest:

DONALD J. QUIGG

*Attesting Officer*     *Acting Commissioner of Patents and Trademarks*